United States Patent [19]
Koontz et al.

[11] 3,743,561
[45] July 3, 1973

[54] MANUFACTURE OF FIBER REINFORCED POLYMER ARTICLES

[75] Inventors: Robert D. Koontz, Manhattan Beach; Richard R. Heitkamp; Robert E. Jackson, both of Compton, all of Calif.

[73] Assignee: EFMC Corporation, Compton, Calif.

[22] Filed: Oct. 28, 1970

[21] Appl. No.: 84,700

[52] U.S. Cl. ............... 156/192, 156/194, 156/196, 264/137, 264/157, 264/248, 264/263
[51] Int. Cl. .................. B31c 13/00, B29d 23/00
[58] Field of Search..... 156/191–193, 182, 194, 196; 264/137, 157, 248, 163, 269, 263

[56] References Cited
UNITED STATES PATENTS

| | | | |
|---|---|---|---|
| 2,525,469 | 10/1950 | Anderson | 156/192 X |
| 2,794,481 | 6/1957 | Anderson | 156/194 X |
| 2,977,269 | 3/1961 | Nerwick | 156/196 UX |
| 2,998,339 | 8/1961 | Barnes et al. | 264/102 |
| 2,749,266 | 6/1956 | Eldred | 264/157 X |
| 3,476,625 | 11/1969 | Slivinsky et al. | 264/248 X |
| 1,389,143 | 8/1921 | Kempton | 264/263 X |

Primary Examiner—Philip Dier
Attorney—Edward D. O'Brian

[57] ABSTRACT

What are designated as "composite" fiber reinforced polymer (or plastic) articles or structures can be manufactured using what are termed "preformed" articles and "intermediate" articles. Such a preformed article may be created by compressing in a chilled die a mixture of reinforcing fibers and a hot melt polymer composition at a temperature at which the composition will flow but below the temperature at which the composition will set up or cure, removing the compressed article from the die and storing it at a low temperature at which it is dimensionally stable until it is ready to be used in a final manufactured article or structure. Such an intermediate article can be manufactured by winding a fiber sheet impregnated with a hot melt polymer composition on a mandrel while subjecting the sheet to pressure and to heat sufficient to cause the composition to flow but not to cure so as to form a dense structure. In the manufacture of a composite article, one or more of the preformed articles are located on an intermediate article and the resultant assembly is cured in a die under heat and pressure. Such preformed and intermediate articles can be cured separately or in contact with other articles by the application of heat and pressure.

2 Claims, 3 Drawing Figures

PATENTED JUL 3 1973　　　　　　　　　　　　　　　　　　　3,743,561

INVENTORS
ROBERT D. KOONTZ,
RICHARD R. HEITKAMP &
ROBERT E. JACKSON
BY
EDWARD D. O'BRIAN
ATTORNEY

MANUFACTURE OF FIBER REINFORCED POLYMER ARTICLES

BACKGROUND OF THE INVENTION

Fiber reinforced structures or articles such as so-called fiberglass structures or articles are commonly utilized in many different applications. A number of different problems have been encountered in the manufacture of such structures or articles. Many of such problems have been essentially of a chemical nature involving such factors as adhesion, curing rates and the like. The present invention is primarily concerned with problems essentially of a physical nature which have been encountered in the manufacture of certain of fiber reinforced structures.

One problem which has been encountered in the manufacture of such structures or articles involves obtaining what may be regarded as maximum physical properties in such articles or structures utilizing known fibrous materials and known polymer systems. Not infrequently it is possible to develop such physical properties on a trial, experimental or laboratory type basis, but substantially impossible to develop such properties consistently in production. It has been commonly recognized that the density of an article or structure is related to the development in a final article or structure of what may be regarded as maximum physical properties.

Another problem which has been encountered in this field relates to the formation of various specialized shaped in ultimate structures or articles. Not infrequently the ultimate use of a structure or article dictates that such a structure or article contain one or more projections or similar protuberances making it impossible or substantially impossible to commercially manufacture such a composite structure or article by established methods. This is particularly the case when it is desired that the physical properties of such projections or protuberances are the same or substantially the same as the physical properties of the remainder of such a structure or article.

SUMMARY OF THE INVENTION

The present invention has a number of different objectives which are related to these problems. Broadly an objective of the present invention is to provide new and improved processes for the solution of these problems. The invention is also intended to provide processes for the production of what may be regarded as composite structures or articles which can be easily and conveniently carried out at a comparatively nominal cost in what may be regarded as large scale or commercial production. These objectives standing by themselves are, however, somewhat misleading as to the complete aspects of the subject matter disclosed herein.

An objective of the present invention is to provide a new and improved technique or process for the manufacture of what are referred to herein as "preformed" or "preformed" articles, which articles may be cured to a final product separately or which may be cured in contact with another intermediate article so as to form a final composite fiberglass reinforced polymer structure or article such as a structure containing a protuberance or projection created from such a preformed article. In connection with the manufacture of such a preformed article the invention is intended to supply a process which may be also easily and conveniently carried out at a comparatively nominal cost on a commercial scale. An objective of the invention is also intended to provide such preformed articles as staple articles of commerce which can be separately manufactured and sold.

Another objective of the present invention is to provide a new and improved technique or process for the manufacture of what are referred to herein as "intermediate" articles or structures, which articles can be utilized in the formation of composite fiber reinforced polymer structures or articles. This process is intended so as to be utilized in order to improve the ultimate physical properties in a final structure or article to what is presently considered to be a maximum extent. What is referred to herein as an intermediate structure or article is intended to be utilized with such a preformed article in the manufacture of a composite fiber-reinforced polymer structure or article. However, if desired, a final structure or article can be created directly from such an intermediate article or structure.

In accordance with this invention such a preformed article or structure is created by forming an intimate or thorough mixture of reinforcing fibers and a conventional hot melt polymer composition, by compressing such a mixture in a chilled die, preferably a die at least at 0° F. while the mixture is at a temperature at which the composition will flow but below the temperature at which the composition will cure or polymerize and removing such a preformed article created by this technique from the die used and storing or holding it at a temperature at which it is dimensionally stable until it is to be used in a final structure. Such a temperature will of course be dependent upon a number of factors as hereinafter indicated.

In accordance with this invention what has been referred to in the preceding discussion as an intermediate article is formed by impregnating a fiber sheet with a hot melt polymer composition which is preferably either the same as or compatible with the hot melt polymer composition used in the preformed article, and then wrapping such a sheet on a mandrel while subjecting it to heat and pressure. During such wrapping or winding the impregnated sheet is preferably at a temperature at which the polymer composition will flow but below the temperature at which such a composition will cure or polymerize. An intermediate structure as herein described may be cured or polymerized directly in accordance with established techniques.

Preferably, however, in the manufacture of what are termed composite structures or articles one or more of the cooled or preformed articles are located on such an intermediate structure and the assembly of such an intermediate article and such a preform is located in a mold or die corresponding to the final shape of an article or structure to be manufactured before the preformed structure has any significant chance of changing in dimension as the result of ambient heating. The assembly in such a mold or die is then heated or cured under pressure in accordance with conventional practice. Such a preformed article or structure can be heated or cured against other than the particular immediate article specified herein or can be cured alone in an appropriate mold or die.

BRIEF DESCRIPTION OF THE DRAWING

Further details of this invention will be apparent from a detailed consideration of the remainder of this specification and from the accompanying drawing in which.

Figure 1:
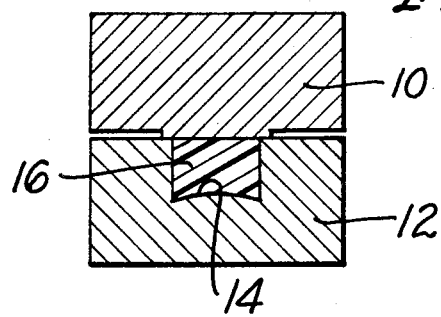
FIG. 1 is a diagrammatic cross-sectional view illustrating the formation of what is referred to herein as a preformed article.

From a consideration of the description of the various views of the drawing, it will be realized that the drawing is primarily intended to be used for explanatory purposes in explaining the nature of the present invention. It will be obvious that the process steps herein described can be carried out utilizing various different types of equipment in the formation of various differently shaped articles through the use and application of routine engineering skill. Because of this the invention is not to be considered to be limited by the drawing and is to be considered as being limited solely by the appended claims forming a part of this closure.

DETAILED DESCRIPTION

So-called hot melt polymer compositions are utilized in the manufacture of what are referred to herein as preformed and intermediate articles. Such polymer compositions are commonly referred to as hot melt adhesives because of their properties. When both a preformed and an intermediate article in accordance with this invention are to be used together in what is referred to herein as a composite article or structure the polymer composition used in both such a preform and such an intermediate article preferably is the same in each so as to avoid any possible question or problem for both the preformed and intermediate article adequately bonding to one another. However, when such articles are to be used together different polymer compositions can be used in each provided that such compositions are compatible in the sense that they will bond one another to create a structure having substantially uniform physical properties.

A large number of suitable hot melt polymer compositions for use with the present invention are commonly known and used. Generally the ingredients of different such compositions used by different manufacturers are held on a trade secret or proprietary basis. Compositions of a type useable with the invention are those falling with the Department of Defense specification known as "Mil-R-9300A." Other related polymer systems can, of course, be used. As an example of a useable polymer composition capable of being employed with the invention is as follow:

50 pts. ERLA 2774 liquid epichlorohydrinbisphenol produced by the Union Carbide Corp., New York, New York.

50 pts. EPON 1001 crystalline epichlorohydrinbisphenol produced by the Shell Chemical Co., New York, N.Y.

18 pts. HYCAR CTBN liquid carboxyl terminated acrylonitrile elastomer produced by the B.F. Goodrich Co., Cleveland, Ohio 2 pts. CABOSIL silica thixotropic agent produced by Godfrey L. Cabbot Co., Boston, Mass.

15 pts. HARON BR system dicyandiamide produced by the American Cyanamid Co., New York, N.Y.

1 pt. 37–609 tertiary amine salt produced by Reichold Chemical Co., San Diego, Calif.

These ingredients except for the amine and the dicyandiamide are blended to form a smooth paste at about 160° F. Then the two remaining ingredients are added. This composition will set up or cure at a temperature of from about 275° to 310° F. This composition will flow to a reasonable extent under pressure at a temperature of from about 140° to 160° F. The hotter it gets up to the point where it tends to cure in general the easier this composition will flow. Similarly the composition will behave much like other common fluids such as molasses and the cooler it gets the more resistant to flow it becomes. At temperatures of about 0° F. a composition as specified becomes substantially immobile and at temperatures of from about −10° F. and below the composition becomes extremely coherent and acts essentially as an immobile solid.

Various other hot melt adhesives react in substantially the same way at various temperatures. In general it can be considered that useable, normal or conventional hot temperature adhesives tend to set up or cure comparatively rapidly at temperatures in excess of about 250° F. Although some minor amounts of polymerization will occur in normal hot melt polymer compositions at below this temperature such amounts are sufficiently small so that they may be neglected in the usual circumstance. In general the lower the temperature of a hot melt polymer composition the greater the viscosity of such a composition down to a temperature at which the composition becomes substantially immobile and acts as a coherent body. It is considered that for a conventional or normal hot melt adhesive such a temperature is at least 0° F. and preferably −10° F.

It will be recognized that the temperatures given here are of a generalized category. It is possible to formulate what may be termed as hot melt polymer systems which will set up or cure at temperatures outside of the ranges indicated and which will become substantially rigid at greater or lower temperatures than those specified. These factors are considered in pointing up the fact that the present invention is essentially concerned with physical as opposed to chemical factors, although the physical properties of a polymer system are directly related to the chemical properties of such a system.

In creating what is described herein as a preformed article a mixture is formed in accordance with conventional techniques of the resin or polymer system or composition and the reinforcing fibers to be utilized. Normally such fibers are common "fiberglass" fibers such as are commonly used in reinforcing resins surfaces. However, if desired other known reinforcing fibers can be employed. Such fibers can be either metallic or non-metallic. Preferably they should be of substantially the same lengths as are commonly used in fiberglass reinforced polymer structures. It is considered that such fibers should be sufficiently thin so as to be capable of being bent or deformed.

The mixture of the polymer composition and the fibers used in creating the preform should contain at least sufficient of the fibers to exercise a reinforcing effect on the polymer composition when the composition is set up or cured. It will be realized that this involves what may be considered as continuous variable considerations. It is considered at least 20 percent by weight of the mixture should be the reinforcing fibers for such fibers to be effective in improving the properties of the product. Similarly it is considered that the mixture should contain at least 20 percent by weight of the polymer composition for the mixture to be capable of being adequately bonded together in a final product.

From this it will be apparent that a mixture used in forming a preformed article in accordance with this invention should contain from 20-80 percent by weight of reinforcing fibers and 20-80 percent by weight of the polymer composition. In order to obtain preferable physical properties it is preferred, however, to utilize from 40-60 percent by weight of the fibers and 40-60 percent by weight of the polymer composition. It is considered that optimum strengths are achieved with equal parts by weight of the fibers and of a polymer composition as described. However, to a degree this is misleading. Useable preforms or preformed articles can be created by merely forming a polymer composition as herein indicated omitting any reinforcing fibers.

As indicated in FIG. 1 of the drawing a preformed article is created by compressing a mixture as described between matched dies 10 and 12 in a cavity 14 in the shape of the desired preformed article 16. In doing this the dies 10 and 12 are preferably chilled to a temperature of at least 0° F. and preferably to within the range of from −10° to −15° F. However, the charge of a mixture placed in the cavity 14 is preferably at a temperature where the mixture is capable of flowing as a result of fluidity of the polymer composition employed. Preferably, with a resin composition as described the mixture is charged into the cavity 14 at a temperature from about 140° to 160° F.

In the cavity 14 sufficient pressure is applied to the mixture so that the article 16 is compressed to at least 95 percent of its ultimate or theoretical density. It is considered that it is preferable to apply sufficient pressure so that this article 16 is compressed to at least 98 percent of its ultimate density. The precise amounts of pressure required will of course vary with the precise mixture used. After this density has been achieved the article 16 in the cavity 14 is preferably held under such an amount of pressure until such time as it becomes substantially rigid and coherent as a result of contact with the chilled dies 10 and 12. Then the article 16 may be removed in accordance with conventional techniques from the cavity 14 shown.

Upon such removal the preformed article 16 is preferably immediately stored at a temperature of at least 0° F. and preferably at a temperature of from −10° to −15° F. until such time as the preformed article 16 is ready to be used so as to be cured. This storage is quite important as far as the present invention is concerned. The low temperatures specified hold the preformed article 16 to its molded dimensions in spite of the fact that the inherent resiliency of the fibers within the article 16 will tend to cause the article to "unfold" or "blossom out" from its initial shape.

Figure 2:
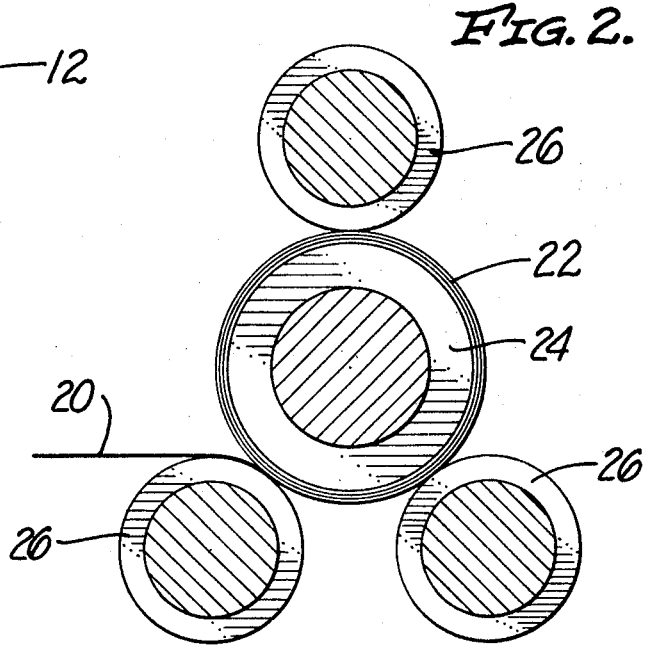
FIG. 2 is a diagrammatic cross-sectional view illustrating the formation of what is referred to herein as an intermediate article.

The procedure used to create what is described herein as an intermediate article or structure is indicated in FIG. 2 of the drawing. Here there is shown a sheet 20 of a fiber material impregnated with a hot melt polymer composition as described. Such impregnation may be accomplished in accordance with conventional techniques and practice. The sheet 20 should contain substantially the same properties of polymer composition and of fiber material as a preformed article 16 as described. Thus, broadly it may contain from 20-80 percent weight of fiber material and 20-80 percent by weight of resin composition and preferably it contains 40-60 percent by weight of either. It is considered that for optimum results it should contain about 50 percent of the resin composition and of fiber material.

The fiber components of the sheet 20 may be any conventional fiber sheet such as is used in creating fiber reinforced polymer structures. Preferably, the fiber sheet employed is of a category meeting Department of Defense specification "MIL-T-2541". It is considered preferable that this sheet have a short fiber nap extending from both of its surfaces so that the fibers of the nap will tend to interlock as an intermediate article or structure 22 is created.

Such a structure is created by winding the sheet 20 while it is at a temperature at which the polymer composition in it will flow around a heated mandrel 24 as this mandrel is rotated. With a hot melt polymer composition as described preferably the sheet 20 is at a temperature from 140°-160°F. as it is wound and it is further heated as it is wound by maintaining the mandrel at a slightly more elevated temperature, preferably a temperature of from 180°-200°F. The mandrel 24 may be easily maintained at such a temperature in accordance with conventional techniques.

An important aspect of the present invention involves applying pressure to the sheet 20 as it is being wound in this manner. Preferably, such pressure is applied by the use of pressure rolls 26 biased towards the mandrel 24. These rolls 26 may be biased in any convenient conventional manner. They also may be heated to the same temperature range as the mandrel 24 although this is not considered necessary. They are preferably used so that the intermediate article or structure 22 is compressed to at least 95 percent and preferably at least 98 percent of its ultimate or theoretical density. The amount of pressure required to accomplish will of course be dependent upon physical type considerations.

Figure 3:
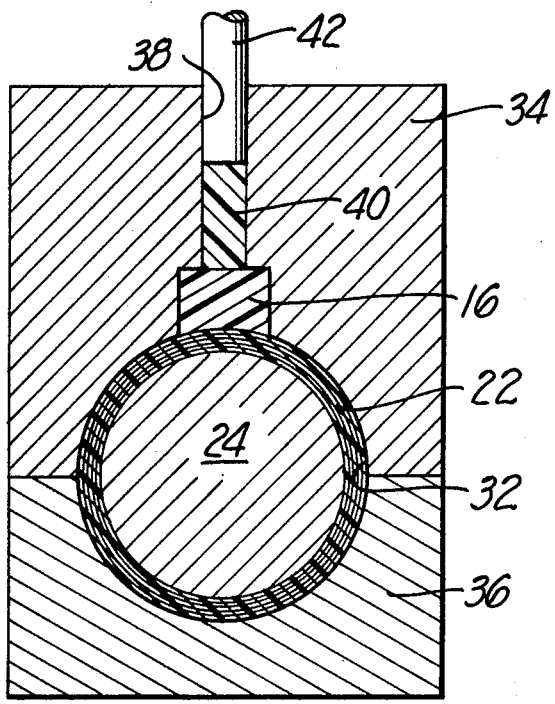
FIG. 3 is a diagrammatic cross-sectional view illustrating the formation of what is referred to herein as a composite article or structure.

After an intermediate article or structure 22 is created as described it may be utilized in the formation of what is referred to herein as a final, composite, reinforced article using a procedure as indicated in FIG. 3 of the drawing. In this procedure the mandrel 24 containing the article 22 may be located in a mold cavity 32 formed between two matched dies 34 and 36 with one or more of the preformed articles 16 against the article 22 within the cavity 32. In order to assure a satisfactory juncture between the surface of an article 16 used in this manner and the structure 22 the surface of the article 16 should be formed so as to have the same shape and configuration as the exterior of the structure 22. In effect, the procedure indicated in FIG. 3 involves creating an assembly from the structure 22 and one or more articles 16 corresponding to the final article 30 to be created.

Such as assembly does not, however, have the external dimensions of the final article 30. As indicated in the preceeding discussion an article 16 and a structure 22 as employed have less than their theoretical densities. As thereinafter described their densities will be increased to nearly the theoretical. Because of their densities the article 16 and the structure 22 will not fit within the cavity 32 if they contain all of the material necessary to fill these cavities in an ultimate article 30. Because of this it is necessary for the cavity 32 to be slightly larger than the intermediate or preformed articles located within it.

It is also necessary to locate a bore 38 leading to the interior of the cavity 32. In use this bore 38 is used essentially as a cylinder in transfer molding a charge 40 of a material which is preferably the same, as but which may be compatible in the sense that it will enter into and bond with the holt melt polymer composition in the preformed article 16 and the intermediate article or structure 22. In use this charge 40 is transferred into the cavity 32 by applying pressure to a plunger or piston 42 slidably mounted in the bore 38.

During the creation of the final article 30 the dies 34 and 36 are held under pressure and heat is applied to them for a sufficient time to cause substantially complete polymerization of the polymer composition within the article 30 being created. The time required will be a function of the temperature used and the resin system employed. As the polymer composition or compositions employed become heated prior to such polymerization to the point that they will flow pressure will be applied to the plunger 42 so as to insert within the cavity 32 adequate polymer material to fill these cavities and to exert pressure upon the intermediate article or structure 22 and any preformed article 16 used to a sufficient extent to increase the densities of these parts or components within the complete articles 30 to close to a theoretical maximum, preferably to at least 99 percent of a maximum theoretical density.

It will be recognized that the heat and pressure employed will be essentially in accordance with conventional practice. With resin systems as indicated in the preceeding discussion, such as the specific polymer composition given, the dies 34 and 36 will be heated to and maintained at a temperature of at least 250°F. and preferably to 275° to 310°F. until such time as a cure is achieved. Pressure will be applied to the plunger 42 as soon as the material present is heated hot enough to flow so as to accomplish the objectives indicated. Normally this will be at a temperature of from about 140° to 160°F. or higher. The amount of pressure used is, of course, the amount necessary to cause the composition to flow and to achieve an ultimate density as indicated. It is considered that specific figures as to such an amount of pressure would be essentially meaningless because the amount of pressure employed will be dependent upon a member of factors which will vary from application to application.

After a complete cure has been achieved in the article 30 this article 30 is removed from between the dies 34 and 36 and from the mandrel 24 in accordance with conventional practice. Any material from the charge 40 adhering to the article 30 may be removed from it by simple mechanical methods such as cutting so that the article 30 will have its desired shape.

It will be realized that the procedures herein described may be easily and conveniently carried out with a minimum of difficulty. This is important as far as the invention is concerned. It will also be realized that the invention makes it possible to obtain fiber reinforced polymer structures having unique shapes which could not satisfactorily be manufactured by prior techniques, and that such structures can combine lightweight and other desirable physical properties.

We claim:

1. A process for forming a structure which comprises:
  1. forming a partially cured, compressed preform to be used as a part of said structure by,
    a. compressing a fluid mixture of a hot melt polymer composition to be used in said preform at a temperature at which said polymer composition will flow below the curing temperature of said composition and of reinforcing fibers into a partially cured, compressed preform having a predetermined shape and having at least 95 percent of its theoretical density,
    b. cooling said preform until said polymer composition becomes rigid and coherent while maintaining said mixture in said shape so as to form said preform, and
    c. maintaining said preform at a temperature at which said composition is rigid and coherent and dimensionally stable,
  2. forming an intermediate article by,
    winding a fiber sheet impregnated with a hot melt polymer composition to be used in the intermediate article on a mandrel while subjecting said sheet to heat and pressure as it is wound on said mandrel said, heat being sufficient so as to cause said composition to flow under the pressure applied, said heat being insufficient to cause said composition to cure, such pressure being sufficient to cause the windings of said sheet on said mandrel to be compacted together to at least 95 percent of the theoretical density of said intermediate article, and
  3. locating said mandrel containing said intermediate article and said preform with the polymer compositions in each in an uncured state with said preform against said intermediate article while said preform is sufficiently cold so as to be rigid, coherent and dimensionally stable in a mold and applying heat and pressure to said intermediate article and said preform so as to cure said polymer c-mposition in said preform and said intermediate article into a unitary structure and so as to increase the densities of said preform and said intermediate article in said unitary structure.

2. A process as claimed in claim 1 wherein:
  said mixture contains from about 20 to about 80 percent by weight of said reinforcing fibers and from about 20 to about 80 percent by weight of said polymer composition,
  said compressing is carried out while said mixture is at a temperature of from about 140° to about 160°F.,
  said cooling is partially accomplished by holding said mixture in contact with a mold until said mixture becomes rigid and coherent,
  said maintaining is carried out at a temperature of from about −10° to about −15°F.,
  said winding is carried out with said sheet at a temperature of from about 140° to about 160°F. while said mandrel is at a temperature of from about 180° to 200°F., said mandrel serving to heat said sheet during said winding.

* * * * *

UNITED STATES PATENT OFFICE
CERTIFICATE OF CORRECTION

Patent No. 3,743,561　　　　　　　Dated July 3, 1973

Inventor(s) Robert D. Koontz; Richard R. Heitkamp; and Robert E. Jackson

It is certified that error appears in the above-identified patent and that said Letters Patent are hereby corrected as shown below:

Column 1, line 31, "shaped" should read - shapes -

Column 3, line 54, "follow" should read - follows -

Column 5, line 68, "20-80%" should be followed by the word - by -

Column 6, line 61, "thereinafter" should read - hereinafter -

Column 7, line 45, "member" should read - number -

Signed and sealed this 26th day of March 1974.

(SEAL)
Attest:

EDWARD M. FLETCHER, JR.　　　　　C. MARSHALL DANN
Attesting Officer　　　　　　　　Commissioner of Patents